US012794668B2

(12) United States Patent
Sabev

(10) Patent No.: US 12,794,668 B2
(45) Date of Patent: Nov. 10, 2026

(54) SYSTEMS AND METHODS FOR MEMORY REPLAY PROTECTION

(71) Applicant: Pensando Systems, Inc., Santa Clara, CA (US)

(72) Inventor: Anton Sabev, San Jose, CA (US)

(73) Assignee: PENSANDO SYSTEMS, INC., Santa Clara, CA (US)

( * ) Notice: Subject to any disclaimer, the term of this patent is extended or adjusted under 35 U.S.C. 154(b) by 55 days.

(21) Appl. No.: 18/602,875

(22) Filed: Mar. 12, 2024

(65) Prior Publication Data

US 2025/0293855 A1 Sep. 18, 2025

(51) Int. Cl.
*H04L 9/06* (2006.01)

(52) U.S. Cl.
CPC .......... *H04L 9/0618* (2013.01); *H04L 9/0643* (2013.01)

(58) Field of Classification Search
CPC ......... H04L 9/002; H04L 9/06; H04L 9/0618; H04L 9/0643
See application file for complete search history.

(56) References Cited

U.S. PATENT DOCUMENTS

| | | | | |
|---|---|---|---|---|
| 2010/0058070 A1* | 3/2010 | Garay | H04L 9/3242 | 711/E12.092 |
| 2011/0154059 A1* | 6/2011 | Durham | G06F 21/79 | 711/163 |
| 2014/0223197 A1* | 8/2014 | Gueron | H04L 9/3242 | 713/193 |
| 2015/0033037 A1* | 1/2015 | Lidman | G06F 21/78 | 713/193 |
| 2017/0083724 A1* | 3/2017 | Chhabra | H04L 9/3242 | |
| 2017/0285976 A1* | 10/2017 | Durham | G06F 21/64 | |
| 2017/0329995 A1* | 11/2017 | Benoit | G06F 21/64 | |
| 2019/0042796 A1* | 2/2019 | Von Bokern | G06F 9/45558 | |
| 2019/0319781 A1* | 10/2019 | Chhabra | G06F 3/0655 | |
| 2020/0358620 A1 | 11/2020 | Kim et al. | | |
| 2022/0123940 A1* | 4/2022 | Bennett | G06F 21/64 | |
| 2022/0182232 A1* | 6/2022 | Marson | H04L 9/0891 | |
| 2022/0207194 A1* | 6/2022 | Chhabra | G06F 7/588 | |
| 2022/0277088 A1* | 9/2022 | Kim | G06F 21/54 | |
| 2022/0318375 A1 | 10/2022 | Chen et al. | | |
| 2024/0070090 A1* | 2/2024 | Gonion | G06F 12/1408 | |

OTHER PUBLICATIONS

Buhrow, Benjamin R. et al. "1 Tb/s Anti-Replay Protection with 20-port On-Chip RAM Memory in FPGAs", IEEE, 2016, 8 pgs.

Elbaz, Reouven et al. "Hardware Mechanisms for Memory Authentication: A Survey of Existing Techniques and Engines", Trans. on Comput. Sci. IV, LNCS 5430, 2009, 22 pgs.

(Continued)

*Primary Examiner* — Shanto Abedin

(57) ABSTRACT

Systems and methods for memory replay protection are disclosed. In an example, a system in the form of a device includes a processor, and a replay protection circuit coupled to the processor and including a memory interface circuit, wherein the replay protection circuit is configured to generate a message authentication code (MAC) from at least one block of data and to access the at least one of block of data via the memory interface circuit using ciphertext that is generated by the replay protection circuit in response to a plaintext memory address received from the processor.

20 Claims, 12 Drawing Sheets

(56) References Cited

OTHER PUBLICATIONS

Gupta, Boudhayan, "A replay-attack resistant message authentication scheme using time-based keying hash functions and unique message identifiers", Feb. 8, 2016, 12 pgs.

Qian, Junlei et al. "A Trusted-ID Referenced Key Scheme for Securing SCADA Communication in Iron and Steel Plants", IEEE Access, vol. 7, 2019, p. 46947-46958.

* cited by examiner

SYSTEMS AND METHODS FOR MEMORY REPLAY PROTECTION

BACKGROUND

Electronic transactions involving sensitive data, such as passwords, cryptographic keys, and authentication tokens, between a processor and an external memory are susceptible to memory replay attacks. In a memory replay attack, a malicious actor may intercept and store data exchanged during a legitimate transaction. The malicious actor may then "replay" the intercepted data at a later time to, for example, impersonate the original user or gain unauthorized access.

SUMMARY

Systems and methods for memory replay protection are disclosed. In an example, a system in the form of a device includes a processor, and a replay protection circuit coupled to the processor and including a memory interface circuit, wherein the replay protection circuit is configured to generate a message authentication code (MAC) from at least one block of data and to access the at least one of block of data via the memory interface circuit using ciphertext that is generated by the replay protection circuit in response to a plaintext memory address received from the processor.

In an example, the ciphertext comprises a ciphertext memory address that is generated from the plaintext memory address received at the replay protection circuit from the processor.

In an example, the replay protection circuit includes a cipher circuit that is configured to generate the ciphertext memory address from the plaintext memory address.

In an example, the replay protection circuit includes a cipher circuit that is configured to generate the ciphertext memory address from the plaintext memory address and a key that is held in the cipher circuit.

In an example, the replay protection circuit includes a cipher circuit configured to generate the ciphertext memory address from the plaintext memory address, a MAC generation circuit configured to generate the MAC from the at least one data block, and an integrity check circuit configured to compare the MAC generated by the MAC generation circuit with a MAC accessed via the memory interface circuit and to output an indication of a security state in response to the comparison.

In an example, the replay protection circuit includes a cipher circuit configured to generate the ciphertext memory address from the plaintext memory address, a MAC generation circuit configured to generate the MAC from the at least one data block, and an integrity check circuit configured to compare the MAC generated by the MAC generation circuit with a MAC accessed via the memory interface circuit and to output an indication of a security state in response to the comparison, wherein the memory interface circuit is configured to 1) write a MAC from the MAC generation circuit to an external memory and 2) provide the MAC accessed via the memory interface circuit to the integrity check circuit.

In an example, the replay protection circuit includes a cipher circuit that is configured to generate the ciphertext from the plaintext memory address.

In an example, the cipher circuit is configured to use a key that is held in the cipher circuit to generate the ciphertext from the plaintext memory address.

In an example, the key is changed upon each power up of the device.

In an example, the replay protection circuit is configured to generate multiple ciphertext memory addresses from the plaintext memory address, access multiple data blocks via the memory interface circuit using the multiple ciphertext memory addresses, and generate the MAC using the multiple data blocks.

In an example, the cipher circuit is configured to use a multiple keys, wherein a key is selected in response to a watermark.

A method for providing replay protection is disclosed. The method involves receiving a memory address from a processor of a device, generating a ciphertext in response to a memory address received from the processor, generating a MAC from at least one block of data, wherein the at least one block of data is accessed from an external memory via a memory interface circuit of the device using the ciphertext, and generating an indication of a security state in response to a comparison of the MAC that was generated from the at least one block of data with a MAC that was accessed via the memory interface circuit using the ciphertext.

In an example, the ciphertext comprises a ciphertext memory address that is generated from the memory address.

In an example, the ciphertext is generated from the memory address at a cipher circuit.

In an example, the memory address comprises a plaintext memory address and the ciphertext comprises a ciphertext memory address.

In an example, generating the ciphertext involves generating the ciphertext with a key that is generated anew upon each power up of the device.

In an example, generating the ciphertext involves generating multiple ciphertext memory addresses from the memory address received from the processor.

Another devices is disclosed. In an example, the device includes a processor, a replay protection circuit coupled to the processor and including a cipher circuit, a memory interface circuit, a MAC generation circuit, and an integrity check circuit, wherein the cipher circuit is configured to generate a ciphertext memory address in response to a plaintext memory address received from the processor, the MAC generation circuit is configured to generate a first MAC from at least one data block, the memory interface circuit is configured to provide a second MAC to the integrity check circuit in response to the plaintext memory address, and the integrity check circuit is configured to compare the first MAC generated by the MAC generation circuit with the second MAC provided by the memory interface circuit and to output an indication of a security state in response to the comparison.

In an example, the cipher circuit uses a key that is held in the cipher circuit to generate the ciphertext memory address from the plaintext memory address.

In an example, the key is changed upon each power up of the device.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
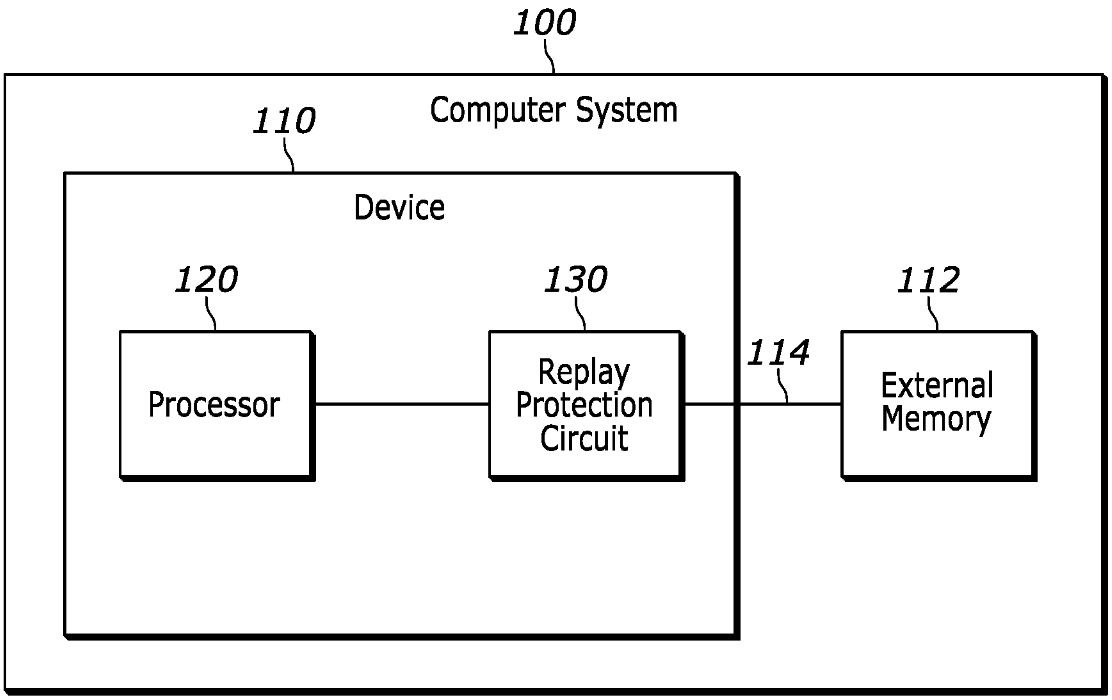
FIG. 1 depicts an example of a computer system that includes a device that is connected to an external memory.

It will be readily understood that the components of the examples as generally described herein and illustrated in the appended figures could be arranged and designed in a wide variety of different configurations. Thus, the following more detailed description of various examples, as represented in the figures, is not intended to limit the scope of the present disclosure, but is merely representative of various examples. While the various aspects of the examples are presented in drawings, the drawings are not necessarily drawn to scale unless specifically indicated.

The present invention may be embodied in other specific forms without departing from its spirit or essential characteristics. The described examples are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single example of the invention. Rather, language referring to the features and advantages is understood to mean that a specific feature, advantage, or characteristic described in connection with an example is included in at least one example of the present invention. Thus, discussions of the features and advantages, and similar language, throughout this specification may, but do not necessarily, refer to the same example.

Furthermore, the described features, advantages, and characteristics of the invention may be combined in any suitable manner in one or more examples. One skilled in the relevant art will recognize, in light of the description herein, that the invention may be practiced without one or more of the specific features or advantages of a particular example. In other instances, additional features and advantages may be recognized in certain examples that may not be present in all examples of the invention.

Reference throughout this specification to "one example", "an example", or similar language means that a particular feature, structure, or characteristic described in connection with the indicated example is included in at least one example of the present invention. Thus, the phrases "in one example", "in an example", and similar language throughout this specification may, but do not necessarily, all refer to the same example.

An integrated circuit (IC) device, such as a processor, often times accesses external memory to write data to the external memory and to read data from the external memory. Upon each read from the external memory, the IC device is susceptible to a replay attack. Various defenses against a replay attack have been implemented with different trade-offs between effectiveness and cost, e.g., in terms of hardware, processing cycles, and/or memory consumption. Some defenses against replay attacks from external memory involve generating a Message Authentication Code (MAC) for each write operation and obfuscating the MAC with an on-chip nonce value so that the MAC may be stored in the external memory (which is typically considered as untrusted memory). Upon a read operation to the same memory address of the external memory, in an integrity check operation, the MAC is generated again on-chip with the same nonce, which is stored in on-chip memory to protect the integrity of the nonce. The generated MAC is then compared to the MAC that is stored in the external memory to detect a replay attack. Although the technique works well to defend against replay attacks, the on-chip storage of nonce values may require considerable on-chip memory.

An example of a technique for protecting against replay attacks as described herein involves a device with a replay protection circuit that is configured to generate a MAC from at least one block of data, with the at least one of block of data being accessed via a memory interface circuit of the device using ciphertext that was generated by the replay protection circuit in response to a plaintext memory address received from the processor. In one example, the ciphertext includes a ciphertext memory address that is generated by the replay protection circuit from the plaintext memory address that was received at the replay protection circuit from the processor. In an example, the replay protection circuit includes a cipher circuit that is configured to generate the ciphertext memory address from the received plaintext memory address.

The MAC serves as a Dynamic Transaction Identifier (DTID) and because the MAC is generated from at least one block of data that is accessed via the memory interface circuit using a ciphertext memory address, it is extremely difficult to correlate data blocks in the external memory with the proper MAC so that a replay attack can be successfully implemented. Because data blocks that are used to generate the MAC are stored on the external memory and not on the device, e.g., on-chip, the technique does not need on-chip memory to store a nonce for each block of data that is written to the external memory. In an example in which two blocks of data are used to generate the MAC, one of the blocks of data may be accessed using the plaintext memory address while the other block of data may be accessed using the ciphertext memory address. Thus, the replay protection circuit need only execute a single cryptographic operation to generate the ciphertext memory address for a write operation and a single cryptographic operation to generate the ciphertext memory address for a read operation to the same memory address. To further increase the level of obfuscation of the MAC, in another example, the MAC may be generated from multiple blocks of data that are accessed using multiple different ciphertext memory addresses.

An example of a technique for protecting against a replay attack is described below with reference to FIGS. 1-7.

FIG. 1 depicts an example of a computer system 100 that includes a device 110, such as an IC device, that is connected to an external memory 112 via a communications interface 114, such as a bus, or buses. The device includes a processor 120 and a replay protection circuit 130. Although not shown in FIG. 1, the processor typically includes a memory interface, an arithmetic logic unit (ALU), a register bank, an instruction fetch unit, and an instruction decoder, which are configured to execute instructions. The processor may also include internal registers that can only be used by the processor (e.g., instruction registers, memory address registers, and memory buffer registers) and user-accessible registers such as address registers and data registers that may be used by external components (e.g., the replay protection circuit) and/or software. Although the device is shown in FIG. 1 as having only a single processor, the device may include more than one processor that is able to access the external memory. Other examples of the processor are possible as long as the processor can initiate read and write operations. The device is typically an IC device, such as a "System-on-Chip" (SoC) or a single-chip microprocessor, but the device may be some other device that accesses an external memory and is thus susceptible to a replay attack.

The external memory 112 may be a memory device that includes RAM memory. For example, the external memory is an external RAM memory such as static RAM (SRAM), dynamic RAM (DRAM), synchronous DRAM (SDRAM), double-data rate SDRAM (DDR-SDRAM or simply DDR), or a combination thereof. In other examples, the external memory may be other than RAM, such as, for example, flash memory. Although the external memory is shown as a single element in FIG. 1, it should be understood that the external memory may include different types of memory. In the example of FIG. 1, the external memory is external from the device (e.g., external from the IC device) in that the memory is not fabricated on the same substrate as the device. For example, the circuits of the device 110 that constitute the processor 120 and the replay protection circuit 130 are not fabricated on the same silicon substrate as the circuits that constitute the external memory. In an example, the communications interface 114 that couples the device to the external memory includes conductive signal lines and/or buses, such as, an address bus, a read/write signal line, and a data bus that enable electrical signals to be communicated between the device and the external memory. Such communications interfaces between a device and an external memory are well known in the field. Although not shown in FIG. 1, the device 110 and the external memory 112 may be connected to the same circuit board (e.g., a printed circuit board (PCB)), with the communications interface that connects the device and the external memory being embedded in the PCB. In other examples, the device and the external memory may not be on the same PCB.

As is described in more detail below, the replay protection circuit 130 of the device 110 is configured to provide protection against a relay attack that may be mounted against the device. For example, the replay protection circuit is configured to provide protection against a replay attack with regard to data that is stored on the external memory 112.

Figure 2:
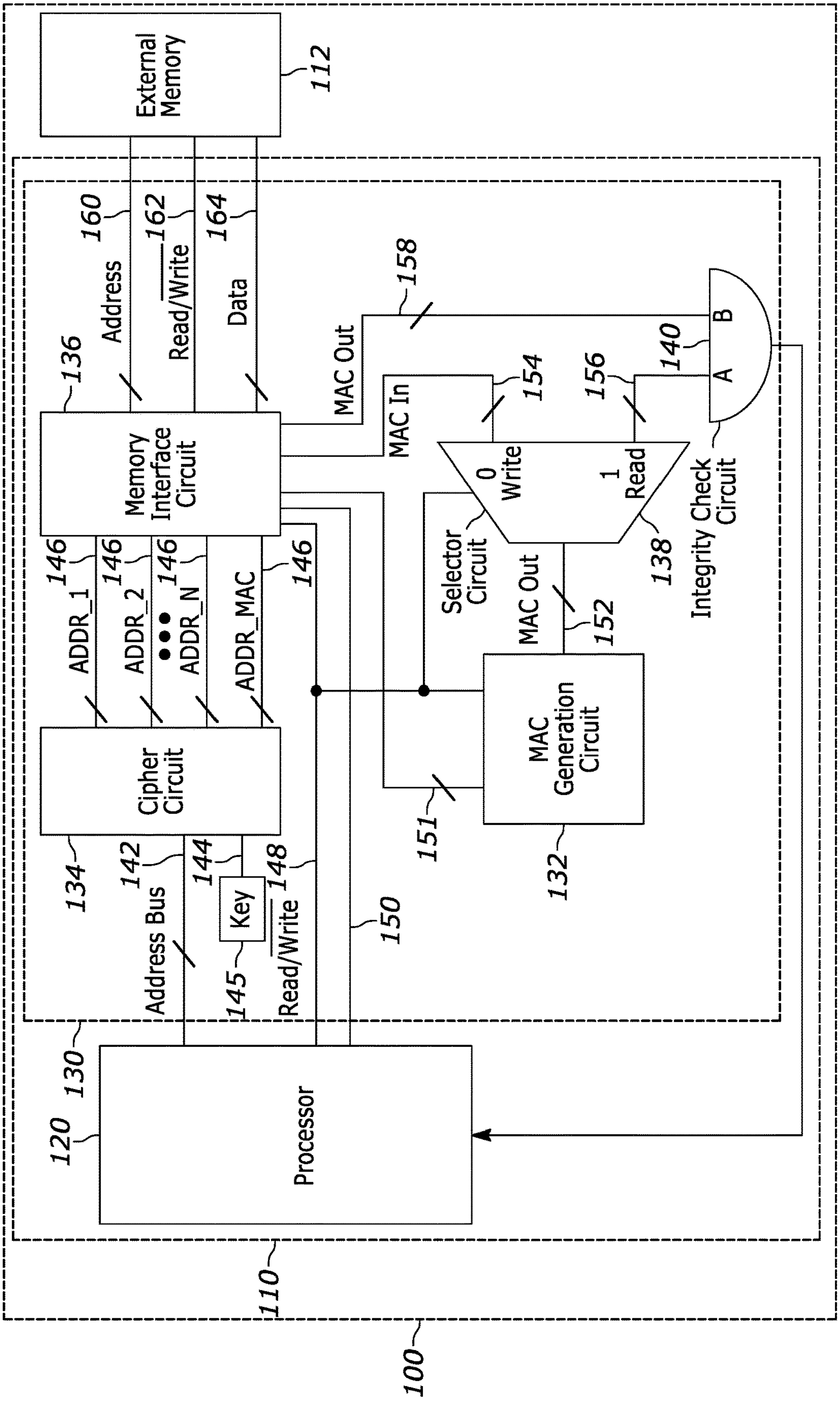
FIG. 2 depicts another view of the computer system shown in FIG. 1 with an expanded view of a replay protection circuit of the device.

FIG. 2 depicts another view of the computer system 100 shown in FIG. 1 with an expanded view of the replay protection circuit 130. As shown in FIG. 2, the computer system includes the device 110 and the external memory 112, and the replay protection circuit 130 includes a MAC generation circuit 132, a cipher circuit 134, a memory interface circuit 136, a selector circuit 138, and an integrity check circuit 140.

The MAC generation circuit 132 of the replay protection circuit 130 is configured to generate a MAC using at least one block of data. Techniques for generating a MAC include applying a hashing function and a key to the at least one block of data using, for example, a MAC generation algorithm such as Hash MAC (HMAC) or Galois MAC (GMAC), although other techniques may be used. In an example, generation of the MAC may involve ISO/IEC 9797-1 and -2, which define generic models and algorithms that may be used with any block cipher or hash function.

In an example, the MAC generation circuit 132 includes hardware circuits that are configured specifically to generate a MAC from at least one block of data. For example, the MAC generation circuit is a hardware circuit that is configured to generate a 64/96/128-bit MAC from a 32/64/128-bit block of data. In another example, the MAC generation circuit is configured to generate a 64/96/128-bit MAC from at least two 32/64/128-bit blocks of data. In still another example, the MAC generation circuit is configured to generate a 64/96/128-bit MAC from N blocks of data (e.g., DATA_1, DATA_2, . . . DATA_N), where each block of data is 32/64/128-bits and N is an integer of $N \geq 1$. Although some examples are given for the size of the MAC and the size of the data blocks, other sizes of MACs and/or data blocks (e.g., in terms of bits) are possible.

In an example, the cipher circuit 134 of the replay protection circuit 130 is configured to transform plaintext to ciphertext. In the example as shown in FIG. 2, the cipher circuit is configured to convert plaintext memory addresses to ciphertext in the same form, or format, as the plaintext memory addresses and referred to herein as ciphertext or ciphertext memory addresses. For example, the plaintext memory addresses are 32-bit memory addresses and the ciphertext memory addresses are also 32-bit values that correspond to addresses in the memory space of the external memory 112. The memory addresses (both plaintext memory addresses and ciphertext memory addresses) may be logical memory addresses or physical memory addresses. With reference to FIG. 2, the cipher circuit is coupled to an input address bus 142 and to a key input 144 that is connected to a key 145 that is stored on the device. In an example, the input address bus is a parallel bus of 32-bits or 32 channels wide, which is configured to receive an 32-bit memory address. The key input is a parallel or serial bus that is coupled to receive the key. In an example, the cipher circuit generates ciphertext memory addresses from plaintext memory addresses by offsetting the plaintext memory address, ADDR_1, to produce offset values and then encrypting the offset values. In one example, the cipher circuit generates ciphertext memory addresses, ADDR_2, . . . ADDR_N, from the plaintext memory address, ADDR_1 by offsetting the plaintext memory address, ADDR_1, N times (where N is an integer≥1) and encrypting the N offset values. An example of the cipher circuit is described below with reference to FIG. 4.

The cipher circuit 134 is also connected to multiple output address buses 146. As shown in FIG. 2, the cipher circuit is connected to output address buses (ADDR_1, ADDR_2, . . . ADDR_N, and ADDR_MAC). In the example, the output address buses are each a parallel bus of 32-bits or 32 channels, similar to the input address bus, although other bus widths are possible. Use of the information on the output address buses is described in more detail below.

In the example shown in FIG. 2, the memory interface circuit 136 of the replay protection circuit 130 is configured to manage the writing of data to the external memory 112 and the reading of data from the external memory. With reference to FIG. 2, the memory interface circuit is coupled to the address buses 146, ADDR_1, ADDR_2, . . . ADDR_N, and ADDR_MAC, which are coupled to the cipher circuit 134. Thus, the address buses 146, ADDR_1, ADDR_2, . . . . ADDR_N, and ADDR_MAC, are buses that are configured to communicate memory addresses, some as plaintext and some as ciphertext, from the cipher circuit 134 to the memory interface circuit 136. The memory interface circuit is also coupled to a read/write signal line 148, to a data bus 150, and to a data bus 151. The read/write signal line 148 is coupled to the processor 120, to the MAC generation circuit 132, and to the selector circuit 138, the data bus 150 is coupled to the processor and to the memory interface circuit, and the data bus 151 is coupled to the memory interface circuit and the MAC generation circuit. In an example, the read/write signal line is a 1-bit signal line and the data buses 150 and 151 are 32/64/128 bit buses. The memory interface circuit is also coupled to the external memory 112 via an address bus 160, ADDR, a read/write signal line 162, and a data bus 164, DATA. In an example, the address bus is a 32-bit bus, the read/write signal line is a 1-bit signal line, and the data bus is a 32/64/128 bit bus. The memory interface circuit is also coupled to a bus 154, MAC_IN, which is coupled to the selector circuit 138 to receive a MAC from the MAC generation circuit and the memory interface circuit is coupled to a bus 158, MAC_OUT, which is coupled to the integrity check circuit 140 to provide a MAC, which is read from the external memory 112, to the integrity check circuit. In an example, the memory interface circuit operates in a write mode when a read/write signal from the processor is a write signal (e.g., a "0") and the memory interface operates in a read mode when the read/write signal from the processor is a read signal (e.g., a "1"). Operations implemented by the memory interface circuit in the write and read modes are described below.

The selector circuit 138 of the replay protection circuit 130 is configured to direct a MAC received from the MAC generation circuit 132 to either the memory interface circuit 136 or the integrity check circuit 140 based on the read/write signal from the processor 120. With reference to FIG. 2, the selector circuit has an input connected to the MAC generation circuit via a bus 152 to receive a MAC and the selector circuit has a first output connected to the memory interface circuit via the bus 154, MAC_IN, and a second output connected to the integrity check circuit via a bus 156. The output of the selector circuit that is active is selected in response to the read/write signal on the signal line 148 from the processor. The selector circuit may be implemented as, for example, a demultiplexing circuit. In an example, the connections that carry the MAC are buses with 64/96/128 parallel channels and the read/write signal line is a signal line that carries a single bit (e.g., 0=write and 1=read). In other examples, the MAC buses and the read/write signal line may be communications interfaces of other sizes. In operation, the selector circuit 138 is configured to direct the MAC received from the MAC generation circuit 132 to the memory interface circuit 136 in response to a write signal (e.g., "0") from the processor 120 and to direct the MAC from the MAC generation circuit to the integrity check circuit 140 in response to a read signal (e.g., "1") from the processor.

The integrity check circuit 140 of the replay protection circuit 130 is configured to output a security response signal in response to a comparison of two MACs that are received at the integrity check circuit. For example, the integrity check circuit is configured to output a security response signal that indicates a potential security issue when the two MACs do not match. In an example, the integrity check circuit is implemented as a hardware comparator that compares values held in registers of the integrity check circuit. With reference to FIG. 2, the integrity check circuit receives a first MAC at input A (e.g., $MAC_A$) from the selector circuit 138 and a second MAC at input B (e.g., $MAC_B$) from the memory interface circuit 136 and compares the two MACs to determine if the two MACs match each other. In an example, the integrity check circuit implements the following logic:

If $MAC_A = MAC_B$, then integrity check signal is "0", and

If $MAC_A \neq MAC_B$, then integrity check signal is "1", where a "0" integrity check signal is interpreted (e.g., by the processor) as no security threat, and a "1" integrity check signal is interpreted (e.g., by the processor) as a security threat.

In an example, replay protection is implemented when a block of data is written to and then read from the same location in the external memory 112. An example operation to implement replay protection is described below with reference to FIGS. 3A-3G. In the example, FIGS. 3A-3D illustrate a write operation of a block of data to an address in the external memory and FIGS. 3E-3G illustrate a read operation of the same block of data from the same address in the external memory. Additionally, the example described with reference to FIGS. 3A-3G utilizes at least two blocks of data to generate a MAC, with at least one of the two blocks of data being accessed using a ciphertext memory address. Although in the example of FIGS. 3A-3G, a MAC is generated from at least two blocks of data, in other examples, replay protection may be implemented using just one block of data, which is accessed from the external memory using a ciphertext address, to generate the MAC.

Figure 3A:
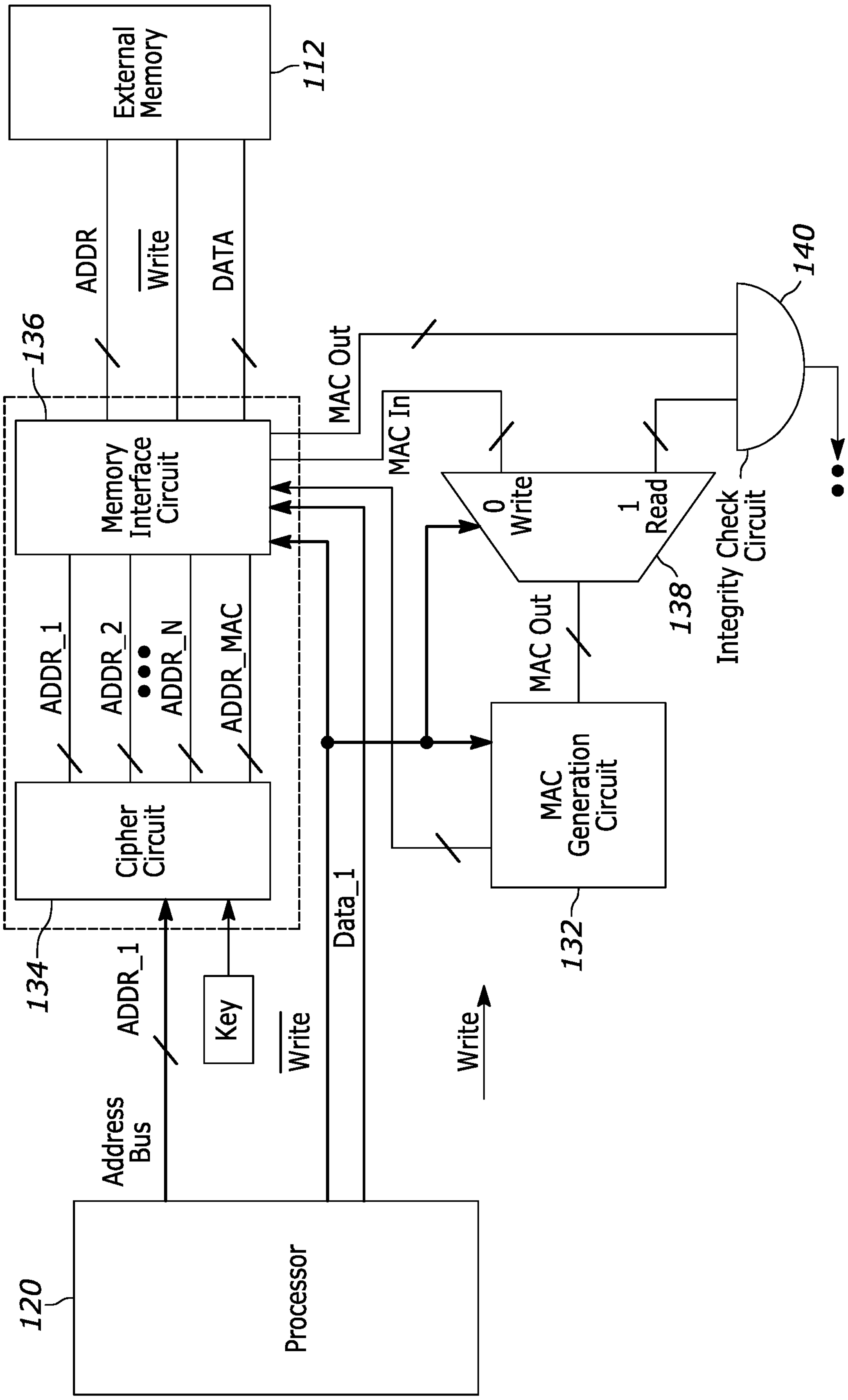
FIG. 3A illustrates operations of a write operation of a block of data to an address in the external memory.

With reference to FIG. 3A, in a first action of the write operation, a write signal, e.g., "0," a data block, e.g., DATA_1, and a memory address, e.g., ADDR_1, are output from the processor 120 on the read/write signal line 148, the data bus 150, and the address bus 142, respectively. The write signal indicates a write operation in which the data block, DATA_1, is to be written to the external memory 112 at memory address, ADDR_1, which is a memory address in the address space of the external memory. The write signal is provided to the memory interface circuit 136, to the MAC generation circuit 132, and to the selector circuit 138, and the memory address, ADDR_1, is provided to the cipher circuit 134, and the data block, DATA_1, is provided to the memory interface circuit 136.

Figure 3B:
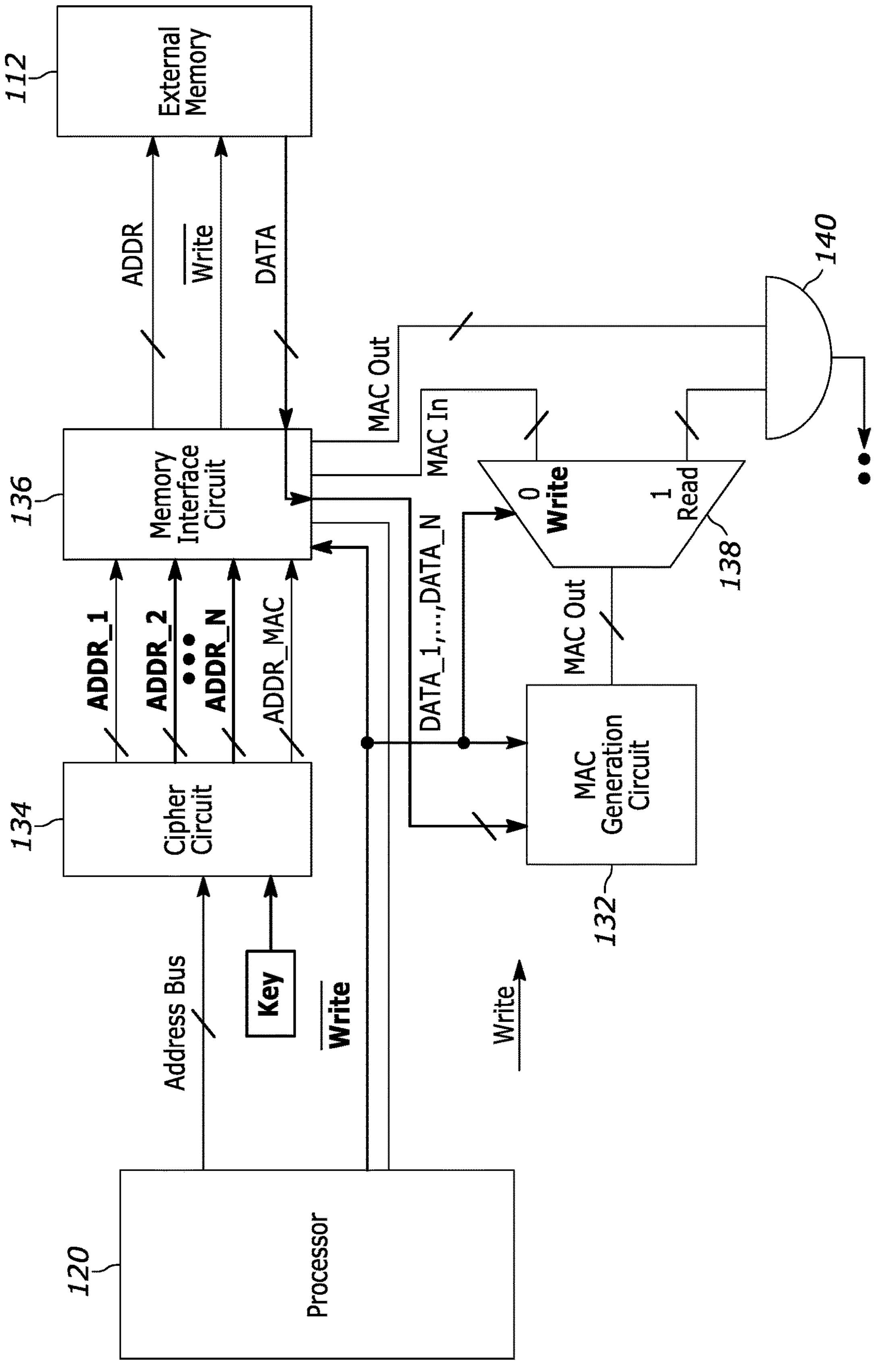
FIG. 3B illustrates operations of the write operation of a block of data to an address in the external memory.

Turning now to FIG. 3B, in a next action, the cipher circuit 134 generates memory addresses, ADDR_2, . . . ADDR_N, from the memory address, ADDR_1, where Nis an integer value of N≥1. In an example, the memory addresses, ADDR_2, . . . ADDR_N, are generated from the memory address, ADDR_1, using a cryptographic operation and a key. The cipher circuit also generates a memory address at which a corresponding MAC will be stored in the external memory, referred to herein as the MAC address, ADDR_MAC. The MAC address, ADDR_MAC, may be generated as a fixed offset of one of the ciphertext addresses. For example, the MAC address, ADDR_MAC, is generated as a fixed offset of the ciphertext memory address, ADDR_2.

In the example described herein, the memory address (e.g., ADDR_1) received at the cipher circuit 134 from the processor 120 is plaintext and the memory address, or memory addresses (ADDR_2, . . . ADDR_N, and ADDR_MAC), that are generated by the cipher circuit from memory address, ADDR_1, are ciphertext. For example, the ciphertext is generated from the plaintext using some cryptographic operation. Thus, the cipher circuit receives plaintext and outputs at least some information as ciphertext. For example, the cipher circuit generates ciphertext memory addresses in a format that corresponds to the memory space of the external memory 112. As described above, ciphertext may be referred to as a ciphertext memory address or ciphertext memory addresses. In the example of FIGS. 3A and 3B, the memory address, ADDR_1, is also passed through the cipher circuit as plaintext, although in other examples, the memory address, ADDR_1, is converted to ciphertext, particularly in an example in which only one block of data is used to generate the MAC, and only the ciphertext is passed to the memory interface circuit.

In a next action and still with reference to FIG. 3B, because the memory interface circuit 136 is operating in write mode due to the write signal from the processor 120, the memory interface circuit accesses data in the external memory 112 that is stored at the memory addresses, ADDR_2, . . . ADDR_N. In particular, the memory interface circuit accesses data blocks, DATA_2, . . . DATA_N, at memory addresses, ADDR_2, . . . ADDR_N, and provides the data blocks, DATA_2, . . . DATA_N, along with data block, DATA_1, to the MAC generation circuit 132 via the data bus 151. In an example, the data blocks are 32/64/128-bit data blocks, although other sizes of data blocks are possible. In an example where caching is not used, the data blocks may match the width of the corresponding buses. In a case where caching is used, the block sizes may match the size of corresponding cache lines.

In a next action, the MAC generation circuit 132 generates a MAC from the data blocks that have been received at the MAC generation circuit. For example, the MAC generation circuit generates a MAC from the data block, DATA_1, which was received at the memory interface circuit from the processor 120 as described with reference to FIG. 3A, and from the data blocks, DATA_2, . . . DATA_N, which were accessed from the external memory 112 at memory addresses, ADDR_2, . . . ADDR_N, by the memory interface circuit. In this example, the process of generating the MAC may be expressed as:

DATA_1,DATA_2, . . . DATA_N→MAC, where DATA_1 is provided from the processor and DATA_2, . . . DATA_N, are accessed using ciphertext memory addresses, ADDR_2, . . . ADDR_N.

In an example in which the MAC is generated from a single data block accessed using a single ciphertext address (e.g., ADDR_2), the process may be expressed as:

DATA_2→MAC, where DATA_2 is accessed using ciphertext memory address, ADDR_2.

Figure 4:
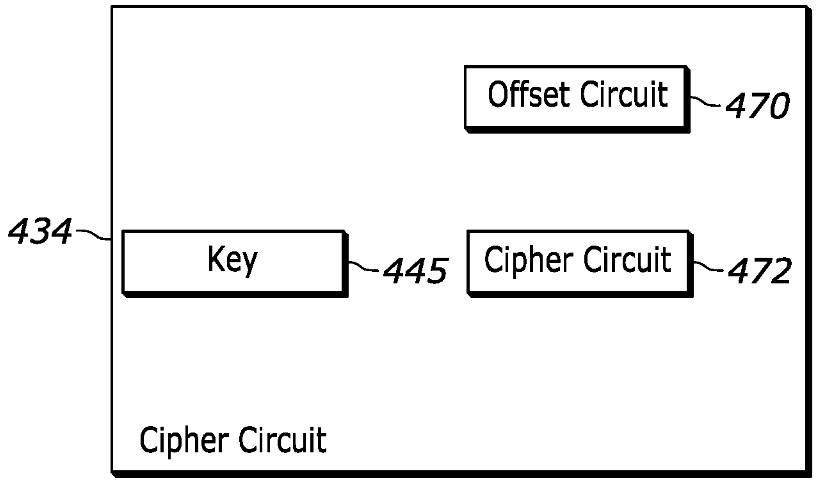
FIG. 4 is an example of a cipher circuit that can be implemented as the cipher circuit in FIG. 2.

An example of the process for generating ciphertext memory addresses from a plaintext memory address is described in more detail below with reference to FIG. 4.

Figure 3C:
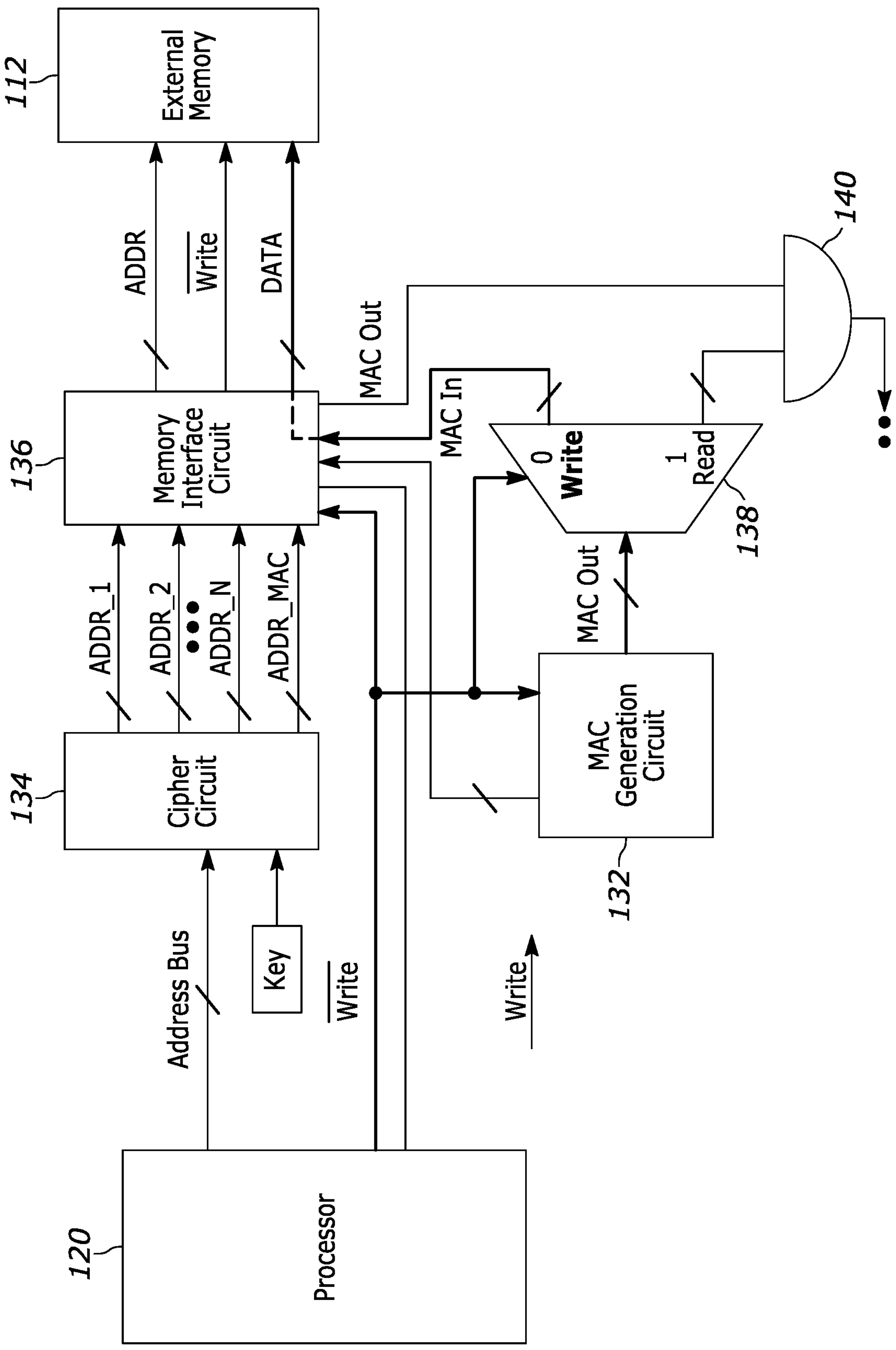
FIG. 3C illustrates operations of the write operation of a block of data to an address in the external memory.

With reference to FIG. 3C, the MAC that is generated by the MAC generation circuit 132 is provided to the selector circuit 138 via bus 152. During the write operation, the selector circuit is subjected to the write signal (e.g., "0") from the processor 120, which causes the selector circuit to output the MAC on the write output that is coupled to the memory interface circuit 136 via bus 154. The memory interface circuit 136 receives the MAC on the bus 154, MAC_IN, and writes the MAC to the external memory 112 at the MAC address, ADDR_MAC, which was generated by the cipher circuit 134. Thus, the write operation involves generating the MAC from at least one block of data that was accessed via the memory interface circuit using a ciphertext memory address, e.g., at least data block, DATA_2, which was accessed from the memory interface circuit 136 using the ciphertext memory address, ADDR_2, and writing the MAC to the external memory at the memory address, ADDR_MAC.

Figure 3D:
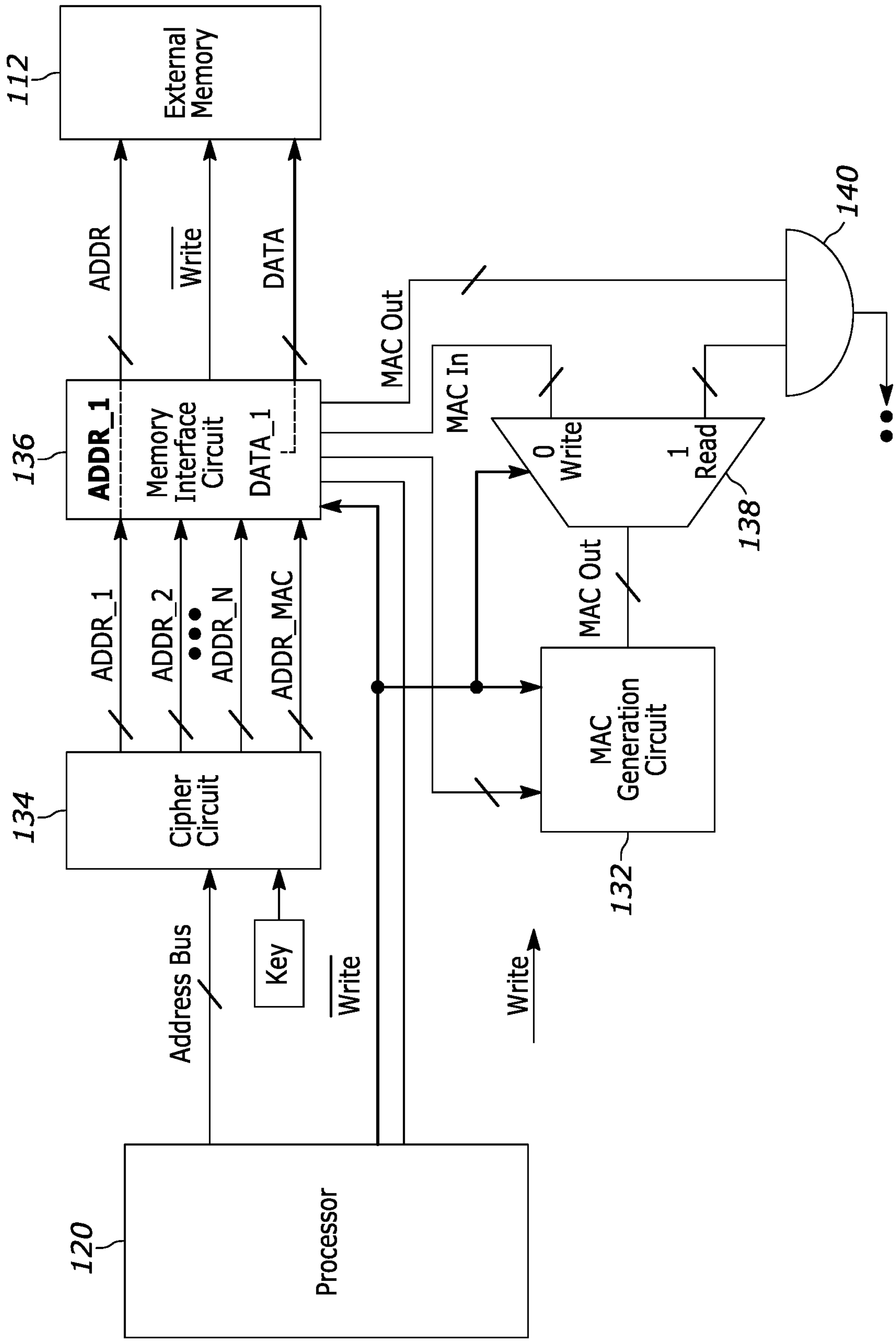
FIG. 3D illustrates operations of the write operation of a block of data to an address in the external memory.
Figure 3E:
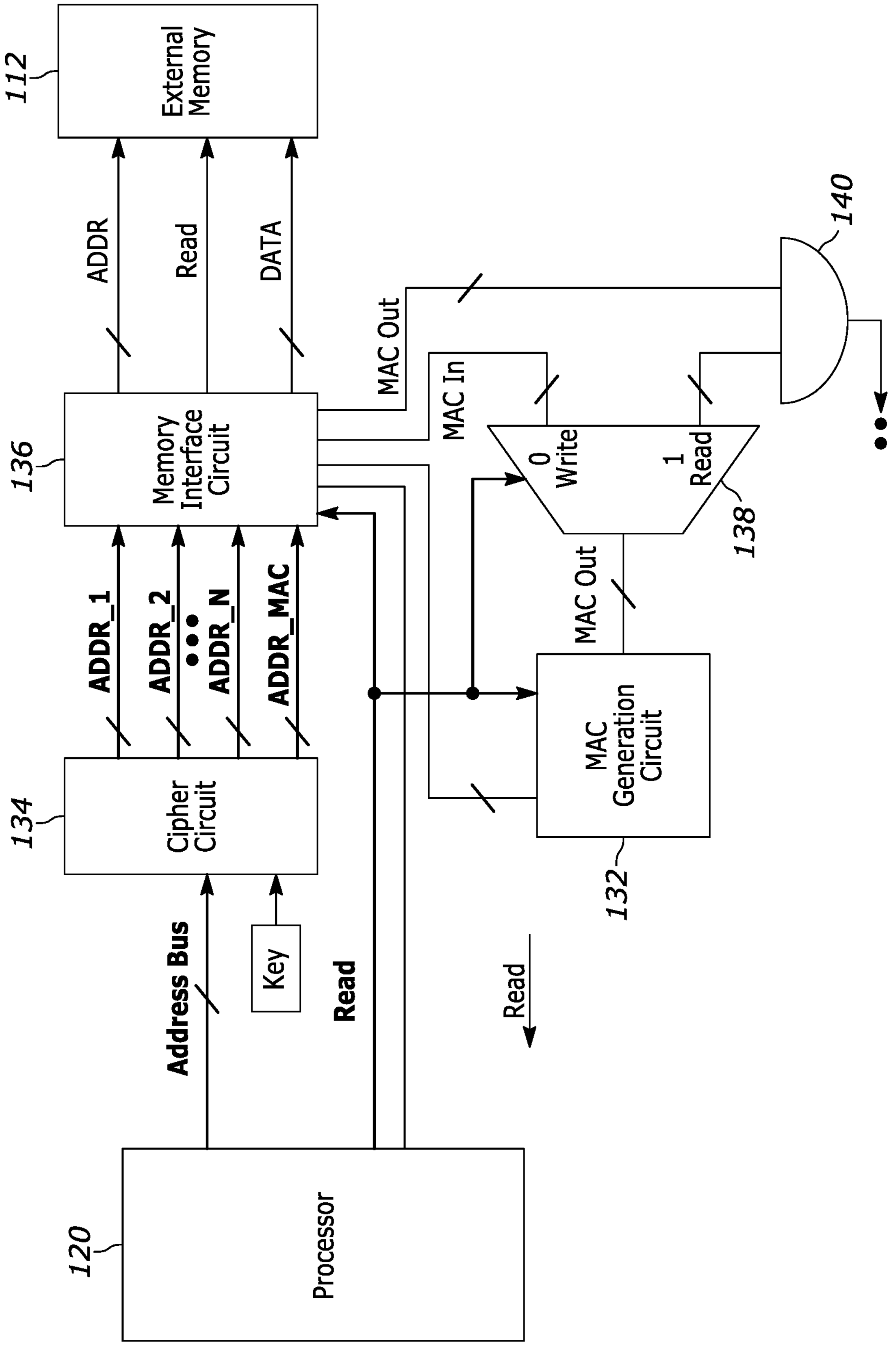
FIG. 3E illustrates operations of a read operation of the same block of data from the same address in the external memory.
Figure 3F:
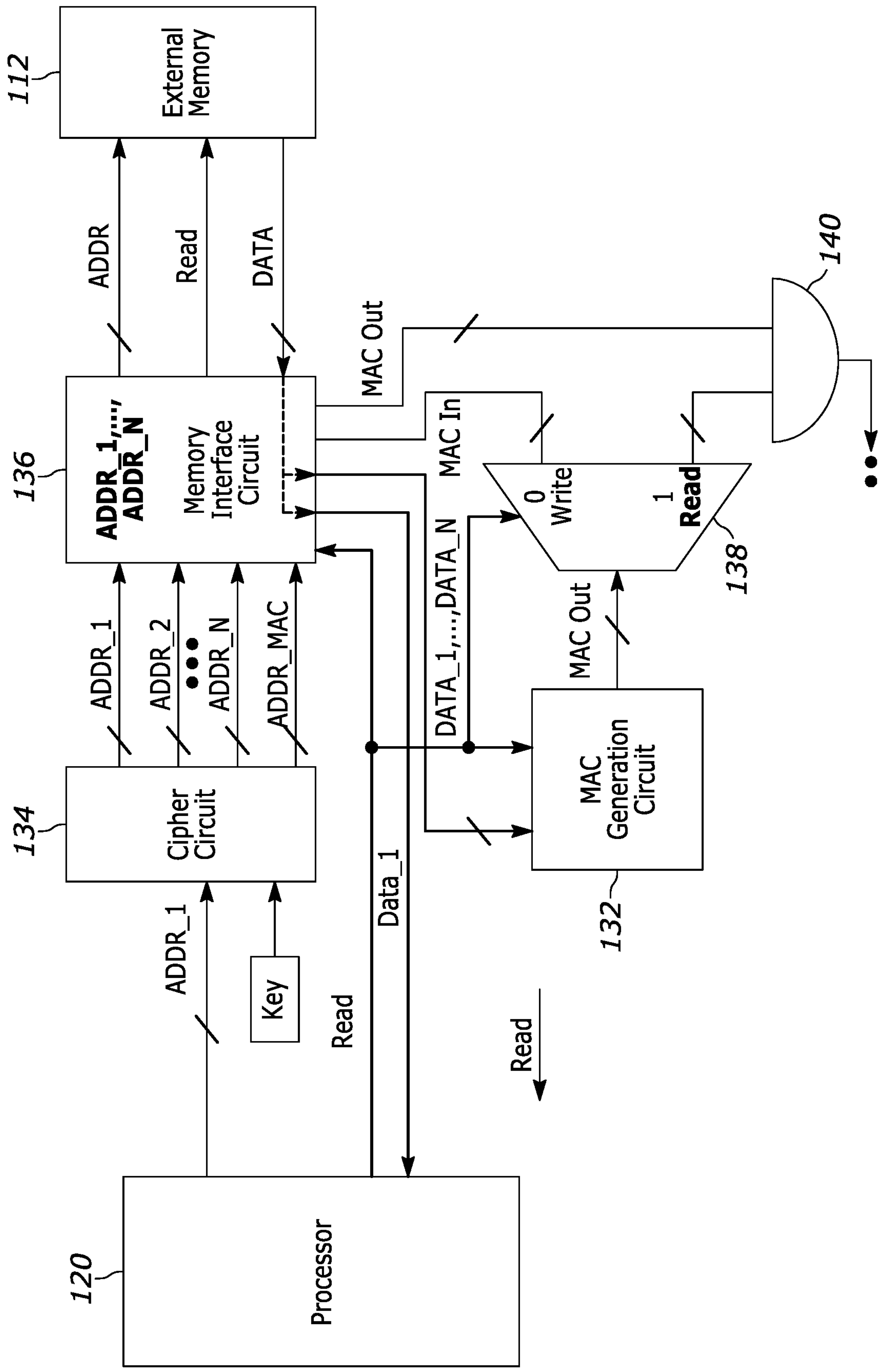
FIG. 3F illustrates operations of the read operation of the same block of data from the same address in the external memory.
Figure 3G:
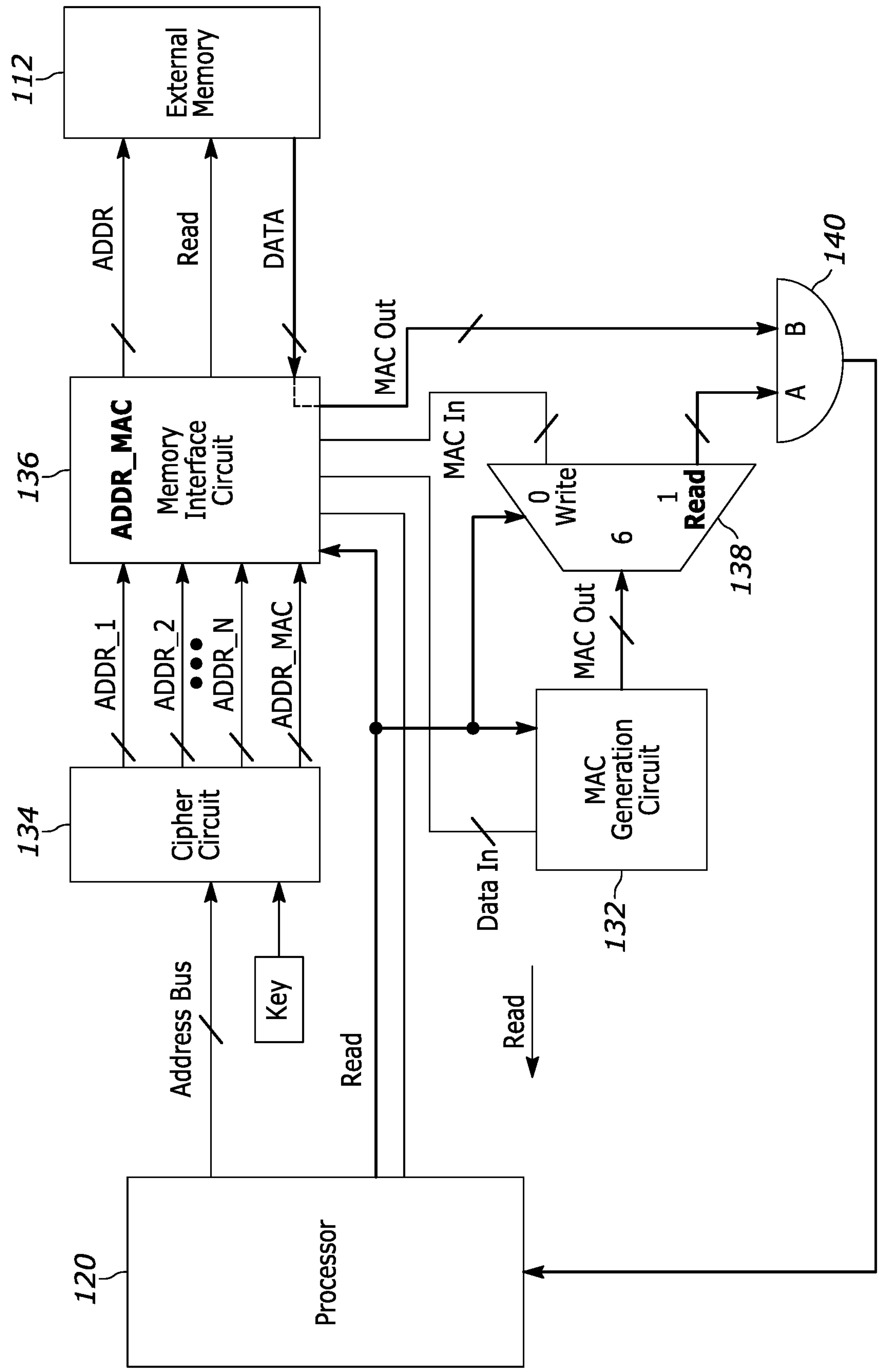
FIG. 3G illustrates operations of the read operation of the same block of data from the same address in the external memory.

With reference to FIG. 3D, in a next action of the write operation, the memory interface circuit 136 writes the data block, DATA_1, to memory address, ADDR_1, in the external memory 112. In other examples, the memory interface circuit may write the data block, DATA_1, to the external memory any time after the memory address and the data block are received at the memory interface circuit.

Once the write operation described with reference to FIGS. 3A-3D is complete, the replay protection circuit 130 is ready to evaluate memory reads that target the memory address, ADDR_1, in the external memory 112. With reference to FIG. 3E, in a first action of a read operation, a read signal (e.g., "1") is output from the processor 120 on the read/write signal line 148 and a memory address is provided to the cipher circuit 134 from the processor on the address bus 142. In the example, the processor initiates a read at memory address, ADDR_1, and thus memory address, ADDR_1, is provided to the cipher circuit from the processor. In a next action, the cipher circuit generates ciphertext memory addresses, ADDR_2, . . . ADDR_N, and the MAC address, ADDR_MAC, from the plaintext memory address, ADDR_1. In the example illustrated herein, the cipher circuit generates ciphertext memory addresses, ADDR_2, . . . ADDR_N, although in other examples the cipher circuit may only generate a single ciphertext address, e.g., ADDR_2. In an example, the ciphertext memory addresses are generated by the cipher circuit using the same key that was used in the write operation (e.g., FIG. 3B) to generate the ciphertext memory addresses. In a next operation, the memory interface circuit 136 receives the plaintext memory address, ADDR_1, and the ciphertext memory addresses, ADDR_2, . . . ADDR_N, ADDR_MAC, from the cipher circuit via the address buses 146.

With reference to FIG. 3F, in a next action, because the memory interface circuit 136 is operating in read mode in response to the read signal from the processor 120, the memory interface circuit reads the corresponding data blocks, DATA_1, DATA_2, . . . DATA_N, from the external memory 112 using the plaintext memory address, ADDR_1, and the ciphertext memory addresses, ADDR 2, . . . ADDR_N received from the cipher circuit 134. The memory interface circuit then provides the data blocks, DATA_1, DATA_2, . . . DATA_N, to the processor and to the MAC generation circuit via the data bus 151. As illustrated in the example of FIG. 3F, the data block, DATA_1, is also provided to the processor 120 via data bus 150.

With reference to FIG. 3G, in a next operation, the MAC generation circuit 132 generates a MAC from the received data blocks, DATA_1, DATA_2, . . . DATA_N. In a next operation, the MAC generation circuit provides the MAC to the selector circuit 138 via the bus 152. During the read operation, the selector circuit is subjected to the read signal (e.g., "1") from the processor 120 via the read/write signal line 148, which causes the selector circuit to output the MAC on the read output that is coupled to the integrity check circuit 140 via bus 156. Additionally, during the read operation the memory interface circuit 136 is subjected to the read signal from the processor, which causes the memory interface circuit to read the MAC, which is stored at the MAC address, ADDR_MAC, from the external memory 112 and to output the MAC on the bus 158, MAC_OUT. The MAC that is output on bus 158, MAC_OUT, is provided to the integrity check circuit 140 along with the MAC from the selector circuit 138 via the bus 156.

In a next operation and still with reference to FIG. 3G, the integrity check circuit 140 compares the just generated MAC address, e.g., $MAC_A$, with the MAC, e.g., $MAC_B$, that was accessed from the external memory 112 at the memory address, ADDR_MAC, by the memory interface circuit 136 and outputs a signal that is indicative of a security state in response to the comparison. In an example, if the generated MAC, $MAC_A$, matches the stored MAC, $MAC_B$, then the integrity check circuit outputs a first signal (e.g., "0"), which indicates a security state in which no security issue exists. The first signal indicates that no security issue exists because the matching MACs indicates that the data block, DATA_1, has not changed since the data block was written to the external memory. However, if the generated MAC, $MAC_A$, does not match the stored MAC, $MAC_B$, then the integrity check circuit outputs a second signal (e.g., "1"), which indicates a security state in which a security issue exists. The second signal indicates that a security issue exists because the mismatch between the MACs indicates that the data block, DATA_1, has changed since the data block was written to the external memory. As described above, in an example, the integrity check circuit 140 implements the following logic:

If $MAC_A=MAC_B$, then integrity check signal is "0", and

If $MAC_A \neq MAC_B$, then integrity check signal is "1", where a "0" is interpreted by the processor as no security threat, and "1" is interpreted by the processor as a security threat.

In an example, the "0" signal from the integrity check circuit 140 is indicative of no security issue and the "1" signal from the integrity check circuit is indicative of a security issue. In an example, the output of the integrity check circuit is provided to the processor 120 as an indication of the security state and the processor may be configured to take some action based on the output from the integrity check circuit. In an example, the signal output from the integrity check circuit may be an interrupt request (IRQ) signal, or an exception signal. In other examples, the signal output from the integrity check circuit may trigger a device reset, or a power down and then power up process at the device. In an example, the processor holds the data, DATA_1, in a data register until a signal is received from the integrity check circuit. If the first signal (e.g., "0"), which indicates that no security issue exists, is received, then the data, DATA_1, is released for subsequent processing by the processor. However, if the second signal (e.g., "1"), which indicates that a security issue does exist, is received, then the data, DATA_1, is dropped from the data register and not released for subsequent processing by the processor. In another example, the processor may be allowed to continue operation and then implements a security response such that a delay in detection could not be exploited to override the security response. For example, a security response may involve a hardware enforced reset instead of a processor reset enforced by an IRQ.

As described above with reference to FIGS. 3B and 3F, the cipher circuit may generate ciphertext memory addresses from the plaintext memory address by offsetting the plaintext memory address, ADDR_1, to produce offset values and then encrypting the offset values. FIG. 4 is an example of a cipher circuit 434 that can be implemented as the cipher circuit 134 described above. In the example of FIG. 4, the cipher circuit includes an offset circuit 470, a cipher circuit 472, and a key 445 that is held in the cipher circuit. In one example, the offset circuit is configured to generate ciphertext memory addresses, ADDR_2, . . . ADDR_N, from the plaintext memory address, ADDR_1 by offsetting the plaintext memory address, ADDR_1, N times (where N is an integer≥1) and the cipher circuit is configured to encrypt the N offset values according to an encryption algorithm and using the key. In an example, the offset circuit is configured to implement fixed offsets or preprogrammed offset entries from a table in registers of the circuit or in a memory. In one example, to generate the ciphertext memory addresses, an offset is added to the plaintext address and then the resulting value is encrypted by the cipher circuit.

In an example, the key held in the cipher circuit 434 is a 256-bit key that is generated anew upon every power-up of the device 110 (FIG. 1). The key may be generated on the device (e.g., "on-chip") using, for example, a random number generator. Alternatively, the key may be obtained from an external source. Although a 256-bit key is described, other key sizes are possible. For example, key sizes of 256-4,096 bits may be used.

In an example, a re-keying scheme may be implemented to increase obfuscation from the perspective of an attacker. For example, the relatively small message space of the cipher block due to the relatively small size of the address buses for the external memory. As a countermeasure, two different keys may be used to generate the ciphertext from the plaintext memory addresses. For example, one key is above a watermark location and another key is at or below the watermark location. Then, one key is occasionally changed and a background process is started to re-compute the tags (e.g., a MAC) to the new key. The background process uses the new key to compute a new tag then moves the watermark up gradually. The regular read and write transactions select which key the cipher circuit uses depending on whether the access address is above the watermark, or at or below the watermark.

Figure 5:
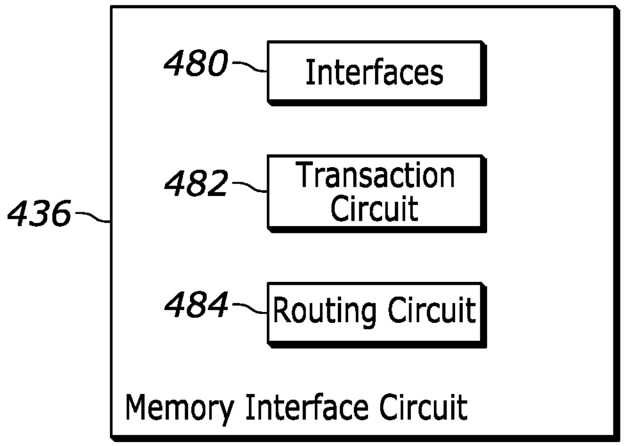
FIG. 5 is an example of a memory interface circuit that can be implemented as the memory interface circuit in FIG. 2.

As described above with reference to FIGS. 3A-3G, the memory interface circuit is configured to manage the writing of data to the external memory 112 and the reading of data from the external memory. FIG. 5 is an example of a memory interface circuit 436 that can be implemented as the memory interface circuit 136 described above. In the example of FIG. 5, the memory interface circuit includes interfaces 480, a transaction circuit 482, and a routing circuit 484. In an example, the interfaces include the interfaces to the cipher circuit, the interfaces to the external memory, and the interfaces to the processor, the MAC generation circuit, the selector circuit, and the integrity check circuit. In an example, the transaction circuit includes circuit logic to process the read and write transactions as controlled by the read/write signal and the routing circuit routes data blocks between the memory interface circuit and the processor, the MAC generation unit, the selector circuit, and the integrity check circuit as described above with reference to FIGS. 3A-3F.

Figure 6A:
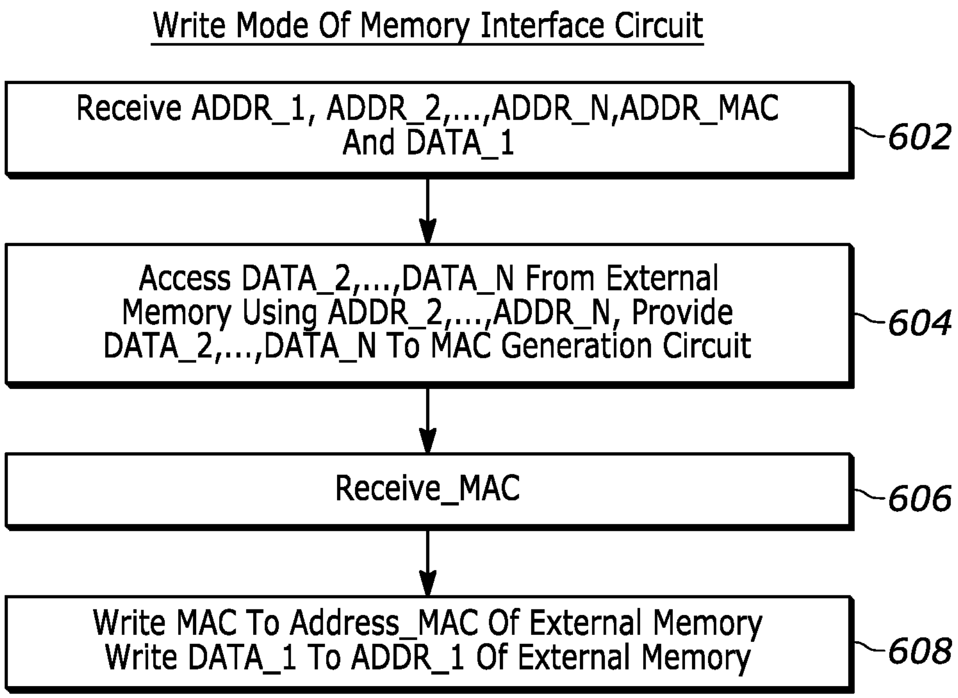
FIG. 6A illustrates operations implemented by the memory interface circuit for a write operation.
Figure 6B:
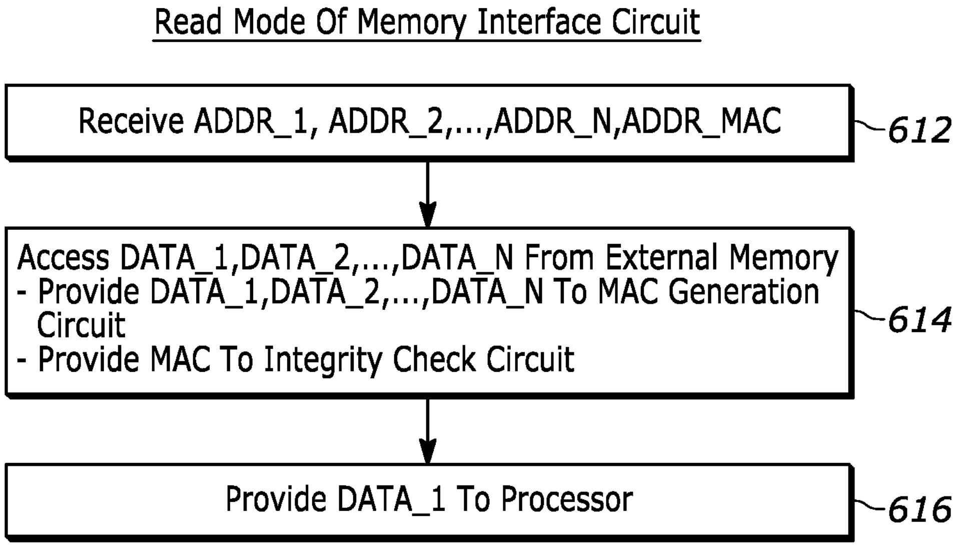
FIG. 6B illustrates operations implemented by the memory interface circuit for a read operation.

Operations implemented by the memory interface circuit 136 and 436 for write and read operations are described with reference to FIGS. 6A and 6B. In particular, FIG. 6A illustrates operations implemented by the memory interface circuit for a write operation and FIG. 6B illustrates operations implemented by the memory interface circuit for a read operation. The operations described with reference to FIGS. 6A and 6B may be implemented in the device in hardware, software, firmware, or some combination thereof.

With reference to FIG. 6A, at block 502, memory addresses, ADDR_1, ADDR_2, . . . ADDR_N, and ADDR_MAC and data, DATA_1, are received at the memory interface circuit. At block 504, data, DATA_2, . . . DATA_N, are accessed from the external memory by the memory interface . . . circuit using addresses, ADDR_2, . . . ADDR_N. The accessed data, DATA_2, . . . DATA_N, is then provided by the memory interface circuit to the MAC generation circuit 132. At block 606, a MAC is received at the memory interface circuit, e.g., from the MAC generation circuit 132 via the selector circuit 138. At block 608, the memory interface circuit writes the MAC to external memory at memory address, ADDR_MAC and the memory interface circuit writes the data, DATA_1, to memory address, ADDR_1, of the external memory.

With reference to FIG. 6B, at block 612, memory addresses, ADDR_1, ADDR_2, . . . ADDR_N, and ADDR_MAC, are received, e.g., from the cipher circuit 134. At block 614, data, DATA_1, DATA_2, . . . DATA_N, and DATA_MAC, are accessed by the memory interface from the external memory using the memory addresses, ADDR_1, ADDR_2, . . . ADDR_N, and ADDR_MAC. The data, DATA_1, DATA_2, . . . DATA_N, is provided to the MAC generation circuit, and the MAC (DATA_MAC) is provided to the integrity check circuit 140. At block 616, the data, DATA_1, is provided to the processor 120.

Figure 7:
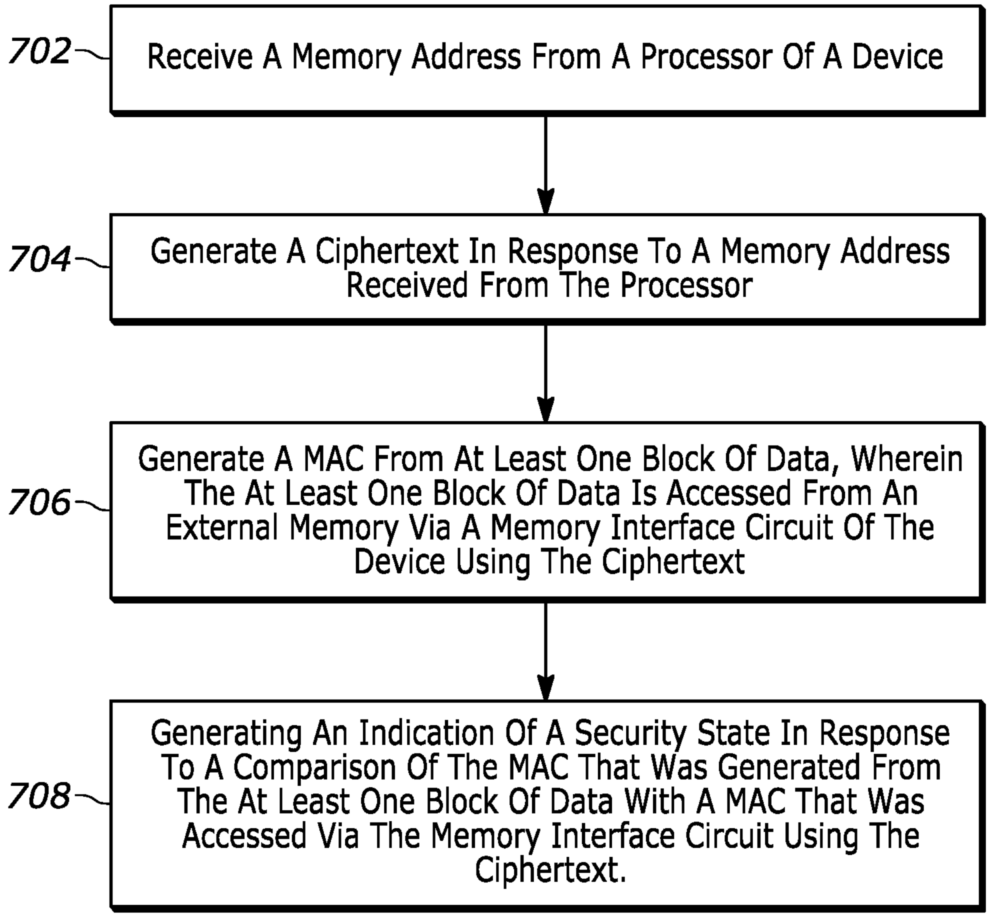
FIG. 7 is a process flow diagram of a method for providing replay protection.

FIG. 7 is a process flow diagram of a method for providing replay protection. In the example of FIG. 7, at block 702, a memory address is received from a processor of a device. At block 704, a ciphertext is generated in response to a memory address received from the processor. At block 706, a MAC is generated from at least one block of data, wherein the at least one block of data is accessed from an external memory via a memory interface circuit of the device using the ciphertext. At block 708, an indication of a security state is generated in response to a comparison of the MAC that was generated from the at least one block of data with a MAC that was accessed via the memory interface circuit using the ciphertext.

Although the operations of the method(s) herein are shown and described in a particular order, the order of the operations of each method may be altered so that certain operations may be performed in an inverse order or so that certain operations may be performed, at least in part, concurrently with other operations. In another example, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an example of a computer program product includes a computer useable storage medium to store a computer readable program.

The computer-useable or computer-readable storage medium may be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific examples of the invention have been described and illustrated, the invention is not to be limited to the specific forms or arrangements of parts so described and illustrated. The scope of the invention is to be defined by the claims appended hereto and their equivalents.

What is claimed is:

1. A device comprising:

a processor; and a replay protection circuit coupled to the processor and including a memory interface circuit, wherein the replay protection circuit is configured to generate a message authentication code (MAC) from at least one block of data and to access the at least one block of data via the memory interface circuit using ciphertext that is generated by the replay protection circuit in response to a plaintext memory address received from the processor, wherein the ciphertext comprises a ciphertext memory address that is generated from the plaintext memory address, and wherein the at least one block of data is accessed from an external memory at the ciphertext memory address.

2. The device of claim 1, wherein the replay protection circuit includes a cipher circuit that is configured to generate the ciphertext memory address from the plaintext memory address.

3. The device of claim 2, wherein the cipher circuit is configured to generate the ciphertext memory address from the plaintext memory address and a key that is held in the cipher circuit.

4. The device of claim 3, wherein the key is changed upon each power up of the device.

5. The device of claim 2, wherein the replay protection circuit includes:

a MAC generation circuit configured to generate the MAC from the at least one data block; and an integrity check circuit configured to compare the MAC generated by the MAC generation circuit with a MAC accessed via the memory interface circuit and to output an indication of a security state in response to the comparison.

6. The device of claim 2, wherein the replay protection circuit includes:

a MAC generation circuit configured to generate the MAC from the at least one data block; and an integrity check circuit configured to compare the MAC generated by the MAC generation circuit with a MAC accessed via the memory interface circuit and to output an indication of a security state in response to the comparison;

wherein the memory interface circuit is configured to 1) write a MAC from the MAC generation circuit to an external memory and 2) provide the MAC accessed via the memory interface circuit to the integrity check circuit.

7. The device of claim 1, wherein the replay protection circuit includes a cipher circuit that is configured to generate the ciphertext from the plaintext memory address.

8. The device of claim 7, wherein the cipher circuit is configured to use a key that is held in the cipher circuit to generate the ciphertext from the plaintext memory address.

9. The device of claim 8, wherein the key is changed upon each power up of the device.

10. The device of claim 1, wherein the replay protection circuit is configured to:

generate multiple ciphertext memory addresses from the plaintext memory address;

access multiple data blocks via the memory interface circuit using the multiple ciphertext memory addresses; and generate the MAC using the multiple data blocks.

11. The device of claim 7, wherein the cipher circuit is configured to use a multiple keys, wherein a key is selected in response to a watermark.

12. A method for providing replay protection, the method comprising:

receiving a memory address from a processor of a device;

generating a ciphertext in response to the memory address received from the processor, wherein the ciphertext comprises a ciphertext memory address that is generated from the memory address;

generating a message authentication code (MAC) from at least one block of data, wherein the at least one block of data is accessed from an external memory via a memory interface circuit of the device at the ciphertext memory address; and generating an indication of a security state in response to a comparison of the MAC that was generated from the at least one block of data with a MAC that was accessed via the memory interface circuit using the ciphertext memory address.

13. The method of claim 12, wherein the ciphertext memory address is generated at a cipher circuit.

14. The method of claim 13, wherein the cipher circuit uses a key that is held in the cipher circuit to generate the ciphertext memory address.

15. The method of claim 12, wherein the memory address received from the processor comprises a plaintext memory address.

16. The method of claim 12, wherein generating the ciphertext involves generating the ciphertext with a key that is generated anew upon each power up of the device.

17. The method of claim 12, wherein generating the ciphertext involves generating multiple ciphertext memory addresses from the memory address received from the processor.

18. A device comprising:

a processor;

a replay protection circuit coupled to the processor and including a cipher circuit, a memory interface circuit, a message authentication code (MAC) generation circuit, and an integrity check circuit, wherein:

the cipher circuit is configured to generate a ciphertext memory address in response to a plaintext memory address received from the processor;

the MAC generation circuit is configured to generate a first MAC from at least one data block, wherein the at least one data block is accessed from an external memory at the ciphertext memory address;

the memory interface circuit is configured to provide a second MAC to the integrity check circuit in response to the plaintext memory address; and the integrity check circuit is configured to compare the first MAC generated by the MAC generation circuit with the second MAC provided by the memory interface circuit and to output an indication of a security state in response to the comparison.

19. The device of claim 18, wherein the cipher circuit uses a key that is held in the cipher circuit to generate the ciphertext memory address from the plaintext memory address.

20. The device of claim 19, wherein the key is changed upon each power up of the device.

* * * * *